May 18, 1937.  E. R. STONE  2,080,839
STOKER DRIVE
Filed July 30, 1936   3 Sheets-Sheet 1

INVENTOR
EARLL R. STONE.

May 18, 1937.  E. R. STONE  2,080,839
STOKER DRIVE
Filed July 30, 1936  3 Sheets-Sheet 2
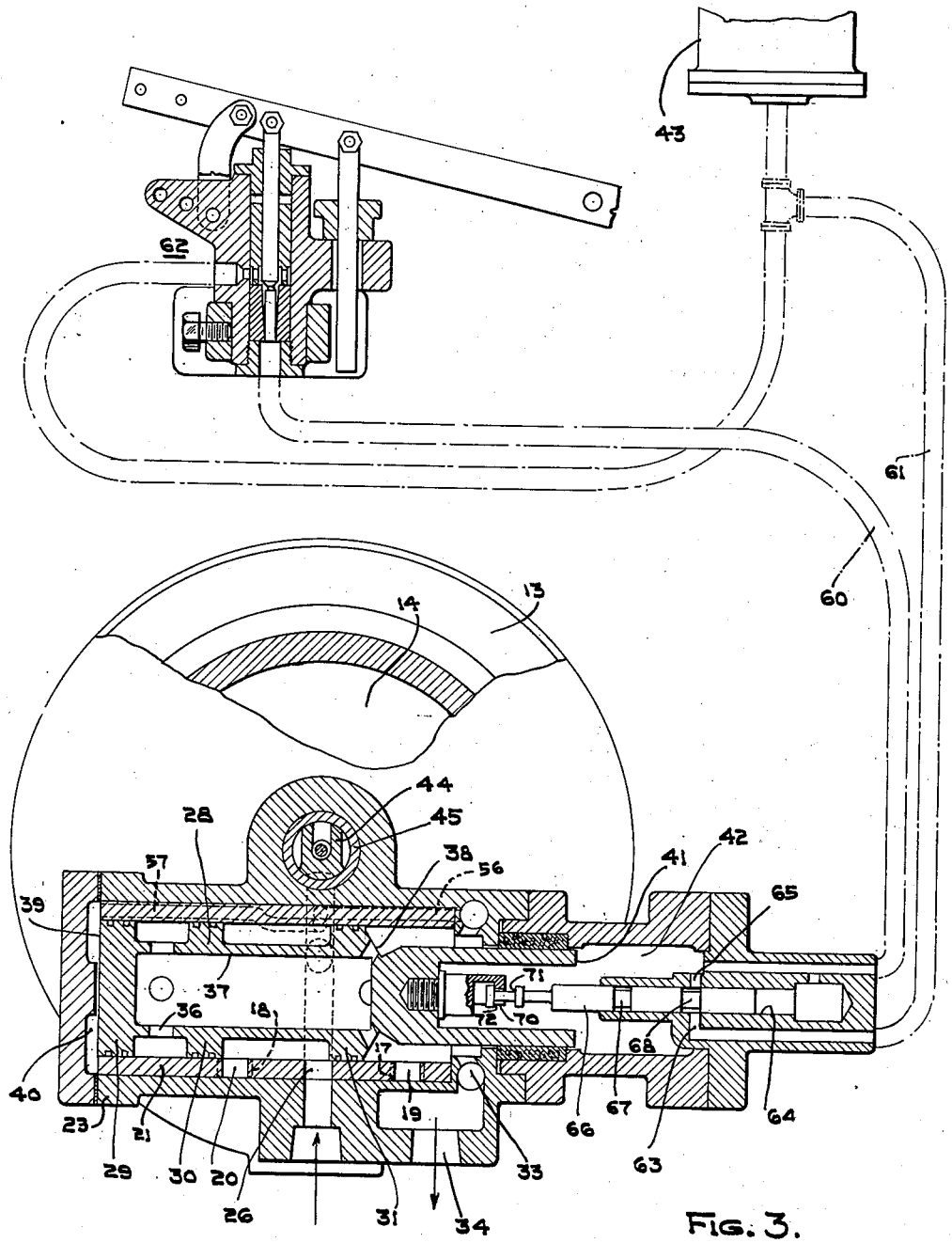
FIG. 3.
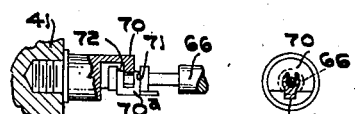
FIG. 3-A.  FIG. 3-B.
WITNESSES:
James K. Mosser
C. L. Wheeler
INVENTOR
EARLL R. STONE.
BY
A. B. Rivers
ATTORNEY Patented May 18, 1937

2,080,839

UNITED STATES PATENT OFFICE 2,080,839

STOKER DRIVE

Earll R. Stone, Lansdowne, Pa., assignor to Westinghouse Electric & Manufacturing Company, East Pittsburgh, Pa., a corporation of Pennsylvania Application July 30, 1936, Serial No. 93,489

6 Claims. (Cl. 121—157)

My invention relates to fluid motor devices for operating underfeed stokers and the like and it has for its object to provide apparatus of this character which shall be economical in consumption of motive medium.

Heretofore, fluid has commonly been used as a motive medium for actuating the operating piston of an operating cylinder of motor devices for apparatus such as underfeed stokers, a common arrangement for this purpose including a piston valve for controlling the admission and exhaust of motive fluid to each end of the operating cylinder, the piston valve being controlled by means of a pilot valve actuated by the operating piston, the arrangement being such that, as the operating piston approaches the ends of its working strokes in each direction, the pilot valve is shifted to secure movement of the piston valve in the other direction; and, the rapidity with which strokes of the piston valve occur controls the dwell intervals between movements of the operating piston, and, therefore, speed of the device operated. To effect this type of operation of the piston valve, the latter has been provided with first and second piston faces forming parts of first and second chambers, the second chamber being in continuous communication with a source of fluid under pressure and the first chamber having medium under pressure supplied and exhausted therefrom by means of the pilot valve, the relationship of pressures of media supplied to the first and second chambers and the areas of the first and second piston faces being such that, when medium under pressure is supplied to the first chamber, the force thereof acting on the piston valve preponderates over the force of medium acting thereon and supplied to the second chamber with the result that a stroke of the piston valve in one direction occurs, and with connection of the first chamber to the exhaust, the medium under pressure supplied to the second chamber is effective to cause a stroke of the piston valve in the opposite direction. A restriction determines the rate of supply to and discharge of medium from the second chamber with the result that the time required for strokes in each direction is determined thereby; and, by varying the restriction, the elapsed time, and, therefore, the speed of operation, may be varied. With this arrangement, obviously, due to the relatively slow motion of the piston valve, motive medium under pressure is supplied to the operating cylinder over a substantial portion of the dwell interval, this application of medium under pressure serving no useful purpose but involving a loss due to leakage around the operating piston from the pressure to the exhaust sides thereof.

Accordingly, a further object of my invention is to provide apparatus of this character having means to assure rapid movement of the valve both at the time of starting a stroke of the operating piston, thus assuring full port opening during the stroke of the latter as well as at the time of completion of a working stroke of the operating piston to interrupt the supply of motive medium thereto, whereby motive medium is applied to the operating piston only when required.

These and other objects are effected by my invention as will be apparent from the following description and claims, taken in connection with the accompanying drawings, and forming a part of this application, in which:

Fig. 3 is a diagrammatic view of the apparatus showing the restriction and the piston valve in section;

Figs. 3a and 3b are detail views showing a spacing member in the lost-motion connection; and, Fig. 4 is a developed view of the interior of the piston valve cylinder showing the relation thereto of the pilot and piston valves.

Figure 1:
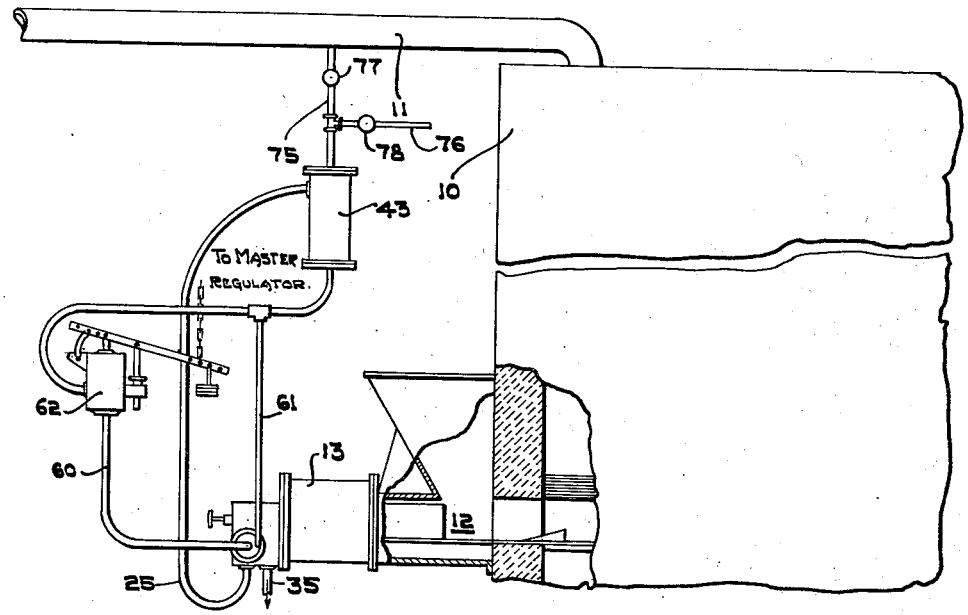
Fig. 1 is a diagrammatic view, with parts in section, showing my invention applied to a stoker and boiler installation.
Figure 2:
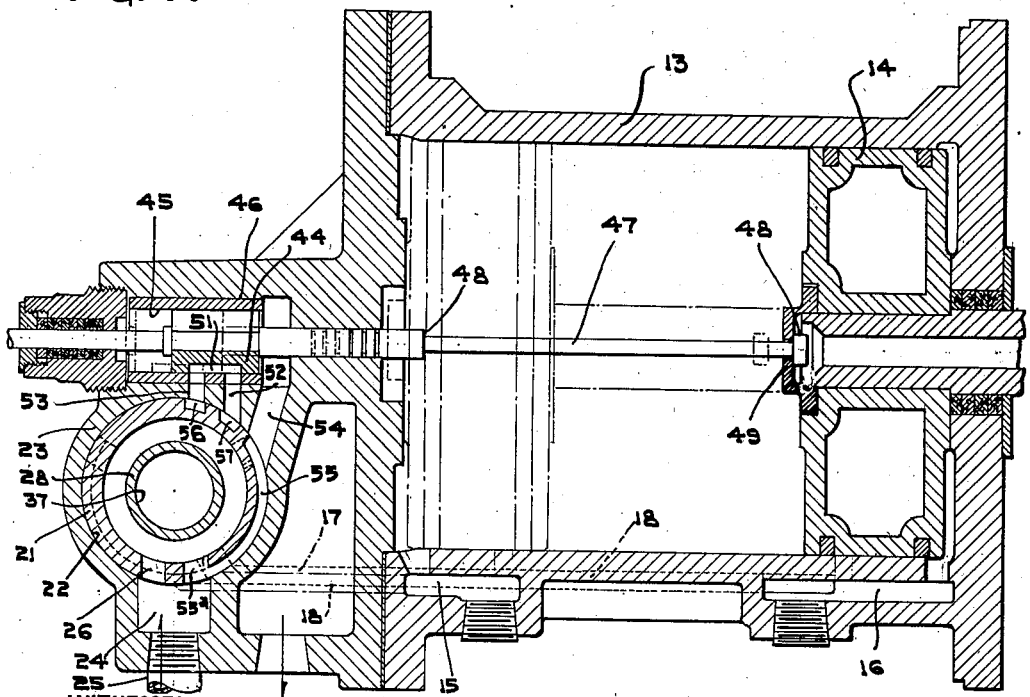
Fig. 2 is a sectional view taken longitudinally of the operating cylinder and of the pilot valve and transversely of the piston valve.
Figure 4:
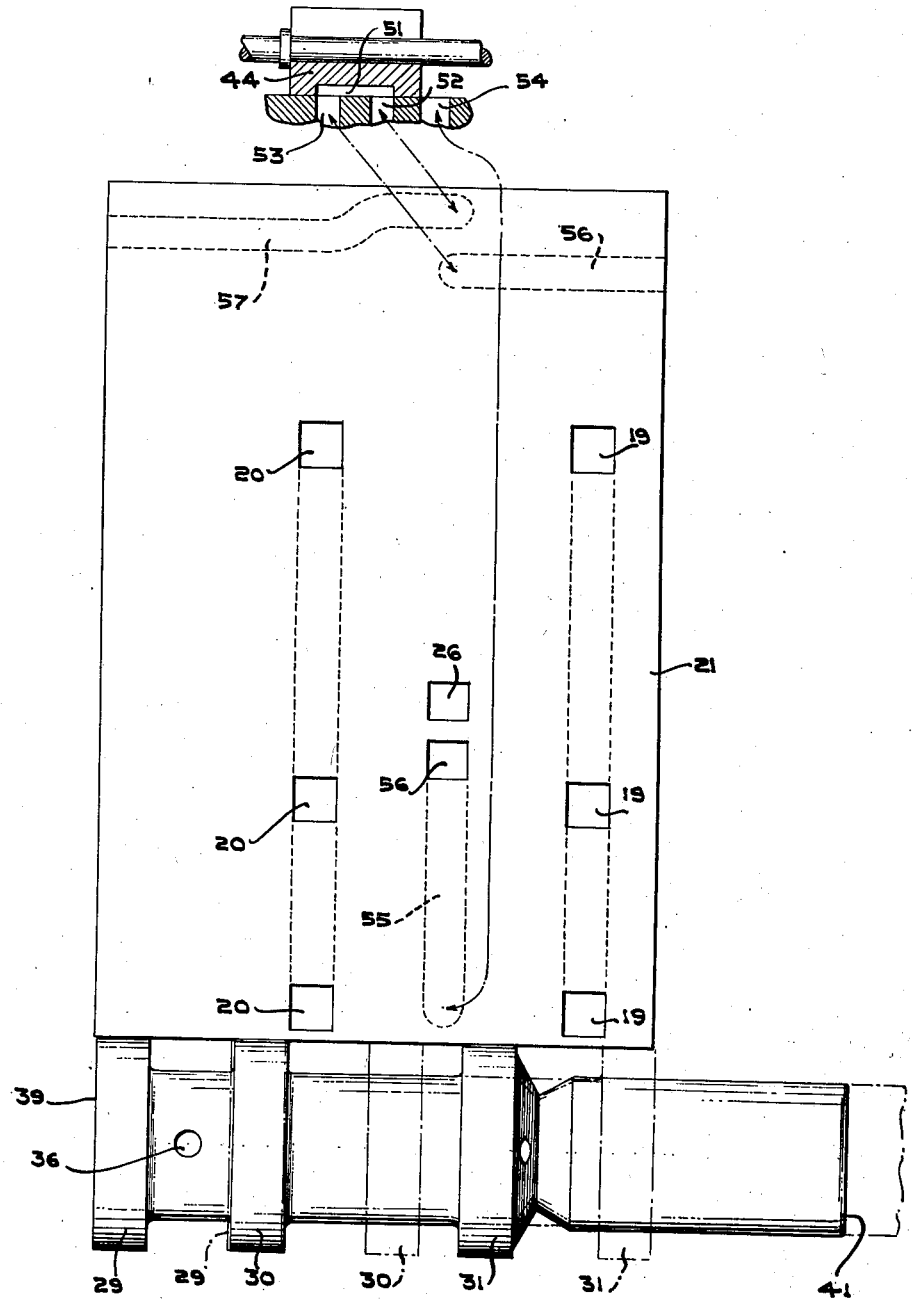

Referring now to the drawings more in detail, there is shown a boiler installation, at 10, provided with an outlet steam pipe 11, the boiler installation having the mechanical stoker 12 operated by the operating cylinder 13.

The operating cylinder 13 has an operating piston 14 arranged therein and it is provided with admission and exhaust ports 15 and 16 connected by passages 17 and 18 to ports 19 and 20 formed in the piston valve bushing 21 arranged in the cylindrical bore 22 provided by the head structure 23 for one end of the operating cylinder 13. While the ports 19 and 20 are each shown as comprised by a set of three to secure adequate flow with small axial length, each set is hereinafter referred to as a port. The head structure 23 has a pressure supply chamber 24 connected to a pressure supply conduit 25 and in open communication with a port 26 provided in the bushing 21.

The pressure port 26 is placed alternately in communication with one of the admission and exhaust ports 20 and 19 and the other is placed in communication with the exhaust by means of a piston valve 28 cooperating therewith. The piston valve 28 includes piston portions 29, 30, and 31, the piston portions 30 and 31 being so spaced and related that the pressure port 26 may be placed in communication either with the admission and exhaust port 20 or 19. If the supply port 26 communicates with the admission port 20 then motive fluid will be supplied to one end of the operating cylinder, fluid being exhausted from the other end of the operating cylinder through the port 19 to the space at the right-hand side of the piston portion 31 and from the latter through the exhaust passages 33 and 34 to the exhaust line 35. The piston valve 28 is made hollow and the additional piston portion 29 is provided to afford an exhaust connection for the port 20, the exhaust being from the latter, through the port 36, the hollow interior 37 of the valve and the ports 38 to the space at the right-hand side of the piston portion 31, and thence to the exhaust connections, as before.

The piston valve 28 is moved in opposite directions by means of pressure supplied to the ends thereof. To this end, the piston valve has a larger piston area 39 forming a closure for a first pressure chamber 40 and a smaller piston area 41 forming a closure for a second pressure chamber 42, the latter chamber being in communication with a source 43 of fluid under pressure.

If fluid is supplied to the first chamber 40 under pressure such that the force thereof acting on the piston area 39 preponderates over the force of medium under pressure acting on the piston area 41, the valve 28 will move to cover the ports 20 and then to place the ports 19 in communication with the pressure supply port 26. If the valve 28 is in the extreme right-hand position and the first pressure chamber 40 is placed in communication with the exhaust, then it will be apparent that the fluid under pressure supplied to the second chamber 42 will be effective to move the valve 28 toward the left, interrupting communication between the ports 19 and the port 26 and later establishing communication between the latter port and the ports 20, the ports 19 being placed in communication with the exhaust incident to this operation.

Referring now to the means for intermittently placing the first chamber 40 in communication with a source of fluid under pressure and with the exhaust, this is preferably done by means of a pilot valve 44 arranged in a bushing 45 disposed within the bore 46 of the head structure 23, the pilot valve being reciprocated or shifted by means of a rod 47 having spaced abutments 48 arranged at either side of the abutment 49 carried by the operating piston, the arrangement being such that, as the operating piston 14 approaches the ends of its strokes in each direction, the rod 47 is actuated to shift the pilot valve from one position to the other.

The pilot valve has a D passage 51 arranged to place the port 52 in communication either with the port 53 or the port 54. The port 54 is connected, by means of the arcuate passage 55 formed in the periphery of the bushing 21, with the pressure supply chamber 24, such arcuate passage terminating in a port 55a opening into the bore of the bushing 21. The ports 52 and 53 communicate with the first chamber 40 and with the exhaust space 33 through grooves 57 and 56 in the sleeve 21, respectively. Thus, it will be seen that, if the D passage 51 places the ports 52 and 54 in communicaion fluid under pressure will be supplied to the first pressure chamber 40 and that if the recess 51 places the ports 52 and 53 in communication, then the first pressure chamber 40 will be placed in communication with the exhaust. If the ports 54 and 52 are in communication, pressure medium will be supplied to the chamber 40 to secure movement of the piston valve toward the right in Figure 3; and, if the chamber 40 is spaced in communication with the exhaust with the valve 28 in the extreme right-hand position, then medium under pressure supplied to the chamber 42 will cause the piston valve to move toward the left.

Apparatus is associated with that already described in order to bring about rapid interruption of the supply of pressure medium to the operating cylinder upon completion of strokes of the operating piston so as to prevent unnecessary leakage of motive medium from the pressure to the exhaust sides of the operating piston. To this end, the chamber 42 is connected to the source 43 by means of a pair of passages 60 and 61, the passage 61 providing continuous open communication between the source 43 and the chamber 42 and communication through the passage 60 being intermittent and occurring at the end portions of the travel of the piston valve.

The passage 60 contains a variable restriction, at 62, so that the rate of supply of medium to the chamber 42 from the source 43 or vice versa may be restricted as desired. The second passage 61 communicates with the port 63 opening into the valve bore 64 and arranged in diametrically opposed relation with respect to the port 65 opening into the chamber 42. A piston valve 66 has reduced or recessed portions 67 and 68 arranged to place the opposed ports 63 and 65 in communication to establish communication between the source 43 and the second pressure chamber 42 so as to permit free ingress or egress of fluid into or from the latter to provide for rapid movement of the valve 28.

The valve 66 has spaced abutments 71 and 72 arranged to be engaged by an abutment 70 provided on the valve 28. The amount of lost motion between the abutment 70 and the abutments 71 and 72 together with the spacing of the reduced or recessed portions 67 and 68 are so chosen that one of the reduced portions effects registration of the ports 63 and 65 as the valve 28 approaches the ends of its strokes in each direction, whereby full communication of the passage 61 with the chamber 42 is established in order that fluid may be supplied to the chamber 43 with sufficient rapidity to secure rapid movement of the valve 28 to accomplish rapid opening of the valve ports 19 and 20 to a desired extent to supply motive medium to the operating piston and to interrupt the supply of medium thereto as soon as working stroke is completed.

The amount of lost motion between the abutment 70 and the abutments 71 and 72 may be varied to vary the character of movement of the piston valve during the port-opening portions of its movement. As illustrated, with lost motion between the abutments, the operation of port opening occurs in two steps, an initial period of slow opening followed by rapid motion thereafter. With the insertion of the spacing member 70a between the abutments, (Figs. 3a and 3b) the entire port opening movement of the valve may be caused to take place rapidly. Where an expansible motive fluid, such as steam, is supplied to the operating cylinder, it is desirable to have opening of the ports started slowly to prevent too rapid movement of the operating piston and consequent shock at the end of the stroke thereof. On the other hand, where a non-expansible motive medium, such as water, is used then it is desirable to have the ports opened rapidly so as to reduce the restriction to admission to the operating cylinder and to secure as rapid response as possible. Thus, it will be seen that the apparatus may be adapted for either kind of motive medium merely by varying the extent of lost motion for the purposes stated. As illustrated, the apparatus may be made to be changed over from one type of motive medium to the other, that is, to change from steam to water, it is merely necessary to insert the spacing member to restrict or eliminate altogether, the lost motion.

Assuming that the piston valve 28 is in its extreme right-hand position, or extreme left-hand position, this being the position for supplying motive medium to the operating cylinder, then, as the operating piston approaches the end of a working stroke, the pilot valve 44 is shifted to place the first pressure chamber 40 either in communication with the source of pressure or with the exhaust; and, as the second pressure chamber 42 is in communication with the source 43 of liquid under pressure, because of registration of one of the reduced or recessed portions 67 and 68, there follows immediate or rapid movement of the valve 28 to the extent required to interrupt the supply of motive medium to the operating cylinder. For example, assuming the valve 28 to be in extreme left-hand position shown in Figure 3, and that the pilot valve 44 is shifted at the end of a working stroke of the operating piston in one direction so as to supply fluid under pressure to the chamber 40, then such pressure is effective to secure rapid movement of the valve 28 toward the right, this rapid movement being permitted because of the rapid discharge of medium provided by the reduced portion 68 and the passage 61. On the other hand, if the valve 28 were in its extreme right-hand position for the stroke of the operating piston in the other direction, then as the end of the operating piston stroke is reached, the pilot valve 44 is shifted to place the chamber 40 in communication with the exhaust; and, as open communication of the passage 61 with the chamber 43 would have been provided by the reduced portion 67, then medium under pressure may rapidly enter the chamber 42 to secure rapid motion of the valve 28 to an extent sufficient to interrupt the supply of motive medium to the operating piston. Rapid motion to interrupt the motive medium supply to the operating piston 14 at the end of each working stroke is terminated by the recesses 67 and 68 moving out of registry with the alined ports 63 and 65, with the result that further movement of the valve 28 must take place more slowly because of restriction of the supply of liquid from the standpipe 43 to the chamber 42 through the conduit 60 and the restriction at 62.

The source 43 of medium under pressure may, for example, be a standpipe or reservoir supplied with liquid such as water. If a connection 75 is provided between the steam line 11 and the standpipe, then steam will condense in the standpipe and the condensate under boiler pressure will constitute the source of medium or liquid under pressure. The standpipe 43 may be supplied with liquid under pressure from any suitable source through the supply line 76. If water is to be derived from steam and subject to steam pressure, the valve 77 in the passage 75 is opened and the valve 78 in the line 76 is closed; and, if the line 76 is to be depended upon, the valve 78 is opened and the valve 77 is closed.

From the apparatus described, it will be apparent that it comprises an operating cylinder and three valves, the first valve being a valve 28 to control the opening and closing of ports for the operating cylinder; the second valve being a pilot valve 44 movable to a first position at the end of strokes of the operating piston in one direction to supply medium under pressure to the chamber 40 and being movable to a second position to exhaust medium from the chamber 40 at the ends of strokes of the operating piston in the other direction; and the third valve being the piston valve 66 operatively connected to the first valve and modifying the supply of medium to or the discharge of medium from the second pressure chamber 42. The present improvement is largely concerned with the provision of the pair of passages 60 and 61 for the second pressure chamber 42 of the first valve 28, the passage 60 being restricted to a desired extent and the passage 61 being arranged to establish full communication between the chamber 42 and the pressure source 43, the passage 61 having the third valve associated therewith and operated by the first valve in such manner that full communication through the passage is established only during port opening and closing portions of the movements of the first valve. A motor device having the first and second valves with a restricted passage between the second pressure chamber of the first valve and the source of medium under pressure is already known, but, as hereinbefore pointed out, this arrangement is subject to the objection of slow port opening and slow port closing because the only means of ingress and egress for medium to and from the second pressure chamber is through the restricted passage. The present invention incorporates an additional passage between the source and the second pressure chamber together with a third valve, the third valve being so operated by the first valve that the events of port opening and port closing may occur with desired rapidity, the rapid closing of ports being particularly desirable in order to reduce leakage loss of motive medium, this being secured by closing a port rapidly after a stroke of the operating piston is completed, whereby an interval of application of operating medium under pressure to the operating piston during the dwell period of the latter is substantially avoided. Aside from the manner of reducing leakage loss of motive fluid, the third valve and the passage provide for desirabe port opening operation, it being possible, with suitable adjustment of the third valve and choice of lost motion between the first and the third valves, not only to secure rapid port closing, but also rapid opening of the ports or initial slow opening of such ports followed by rapid opening thereof. Rapid opening of the ports is desirable where a non-expansible motive medium, such as water, is used; and, where steam is used as motive medium, it is desirable to open the ports slowly, at least for the first portions of the opening movements, to avoid too rapid movement of the operating piston and consequent shock or pounding thereof. As illustrated, the connection between the first and third valves may or may not have lost motion or have lost motion to any desired extent, the use of lost motion providing for slow port opening at least for the initial portions of the opening movements of the ports. The same apparatus may use either steam or water as motive fluid.

While I have shown my invention in but one form, it will be obvious to those skilled in the art that it is not so limited, but is susceptible of various changes and modifications without departing from the spirit thereof, and I desire therefore, that only such limitations shall be placed thereupon as are imposed by the prior art or as are specifically set forth in the appended claims.

What I claim is:

1. In a motor device, an operating cylinder having ports communicating with the ends thereof; an operating piston in the cylinder; a first valve for opening and closing said ports to admit and to exhaust motive medium to each end of the operating cylinder; said first valve having operating means including opposed first and second piston faces; means cooperating with the first piston face to provide a first chamber; means cooperating with the second piston face to provide a second chamber; a second valve movable to a first position to supply pressure medium to the first chamber and to a second position to exhaust medium from the latter; means for moving the second valve to its first position at the end of strokes of the operating piston in one direction and to its second position at the ends of strokes of the operating piston in the other direction; means providing for the continuous application of medium under pressure to the second chamber; the pressures of said medium supplied to the first chamber and of the medium supplied to the second chamber and the areas of said first and second piston faces being so related that the force of the pressure medium applied to the first piston face preponderates over that of the medium supplied to the second piston face to effect a stroke of the first valve in one direction when such medium is applied to the first chamber and to effect a stroke thereof in the other direction when said medium is exhausted from the first chamber; said means providing for continuous application of medium under pressure to the second chamber including a source of medium under pressure and first and second passages to afford communication between said source and the second chamber and said first passage providing for continuous communication between the source and the second chamber; means providing a restriction in said first passage; a third valve associated with the second passage; and means for opening said third valve during at least a part of the movements of the first valve required to open and close a port and including the port closing portion thereof.

2. In a motor device, an operating cylinder having ports communicating with the ends thereof; an operating piston in the cylinder; a first valve for opening and closing said ports to admit and to exhaust motive medium to each end of the operating cylinder; said first valve having opposed first and second piston faces; means cooperating with the first piston face to provide a first chamber; means cooperating with the second piston face to provide a second chamber; a second valve movable to a first position to supply pressure medium to the first chamber and to a second position to exhaust medium from the latter; means for moving the second valve to its first position at the end of strokes of the operating piston in one direction and to its second position at the ends of strokes of the operating piston in the other direction; means providing for the continuous application of medium under pressure to the second chamber; the pressures of said medium supplied to the first chamber and of the medium supplied to the second chamber and the areas of said first and second piston faces being so related that the force of the pressure medium applied to the first piston face preponderates over that of the medium supplied to the second piston face to effect a stroke of the first valve in one direction when such medium is applied to the first chamber and to effect a stroke thereof in the other direction when said medium is exhausted from the first chamber; said means providing for continuous application of medium under pressure to the second chamber including a source of medium under pressure and first and second passages to afford communication between said source and the second chamber and said first passage providing for continuous communication between the source and the second chamber; means providing a restriction in said first passage; a third valve associated with the second passage; and means operated by the first valve for opening said third valve to establish unrestricted communication with said pressure source at predetermined positions of the first valve during its movement.

3. In a motor device, an operating cylinder having ports communicating with the ends thereof; an operating piston in the cylinder; a first valve for opening and closing said ports to admit and to exhaust motive medium to each end of the operating cylinder; said first valve having opposed first and second piston faces; means cooperating with the first piston face to provide a first chamber; means cooperating with the second piston face to provide a second chamber; a second valve movable to a first position to supply pressure medium to the first chamber and to a second position to exhaust medium from the latter; means for moving the second valve to its first position at the end of strokes of the operating piston in one direction and to its second position at the ends of strokes of the operating piston in the other direction; means providing for the continuous application of medium under pressure to the second chamber; the pressures of said medium supplied to the first chamber and of the medium supplied to the second chamber and the areas of said first and second piston faces being so related that the force of the pressure medium applied to the first piston face preponderates over that of the medium supplied to the second piston face to effect a stroke of the first valve in one direction when such medium is applied to the first chamber and to effect a stroke thereof in the other direction when said medium is exhausted from the first chamber; said means providing for continuous application of medium under pressure to the second chamber including a source of medium under pressure and first and second passages to afford communication between said source and the second chamber and said first passage providing for continuous communication between the source and the second chamber; means providing a restriction in said first passage; a third valve associated with the second passage; and means operated by the first valve for opening said third valve during the period of completion of opening of a port by the first valve after initial opening thereof to a desired extent and during the period of port closing.

4. In a motor device, an operating cylinder having ports communicating with the ends thereof; an operating piston in the cylinder; a first valve for opening and closing said ports to admit and to exhaust motive medium to each end of the operating cylinder; said first valve having opposed first and second piston faces; means cooperating with the first piston face to provide a first chamber; means cooperating with the second piston face to provide a second chamber; a second valve movable to a first position to supply pressure medium to the first chamber and to a second position to exhaust medium from the latter; means for moving the second valve to its first position at the end of strokes of the operating piston in one direction and to its second position at the ends of strokes of the operating piston in the other direction; means providing for the continuous application of medium under pressure to the second chamber; the pressures of said medium supplied to the first chamber and of the medium supplied to the second chamber and the areas of said first and second piston faces being so related that the force of the pressure medium applied to the first piston face preponderates over that of the medium supplied to the second piston face to effect a stroke of the first valve in one direction when such medium is applied to the first chamber and to effect a stroke thereof in the other direction when said medium is exhausted from the first chamber; said means providing for continuous application of medium under pressure to the second chamber including a source of medium under pressure and first and second passages to afford communication between said source and the second chamber and said first passage providing for continuous communication between the source and the second chamber; means providing a restriction of variable flow area in said first passage; a third valve for the second passage; and means operated by said first valve for opening said third valve during terminal portions of movements of the first valve to provide for unrestricted communication between the source of medium under pressure and said second chamber so that the first valve may be moved so as to rapidly close ports to interrupt the supply of motive medium to the operating cylinder and for closing said third valve upon effecting such interruption.

5. In a motor device, an operating cylinder having ports communicating with the ends thereof; an operating piston in the cylinder; a first valve for opening and closing said ports to admit and to exhaust motive medium to each end of the operating cylinder; said first valve having opposed first and second piston faces; means cooperating with the first piston face to provide a first chamber; means cooperating with the second piston face to provide a second chamber; a second valve movable to a first position to supply pressure medium to the first chamber and to a second position to exhaust medium from the latter; means for moving the second valve to its first position at the end of strokes of the operating piston in one direction and to its second position at the ends of strokes of the operating piston in the other direction; means providing for the continuous application of medium under pressure to the second chamber; the pressures of said medium supplied to the first chamber and of the medium supplied to the second chamber and the areas of said first and second piston faces being so related that the force of the pressure medium applied to the first piston face preponderates over that of the medium supplied to the second piston face to effect a stroke of the first valve in one direction when such medium is applied to the first chamber and to effect a stroke thereof in the other direction when said medium is exhausted from the first chamber; said means providing for continuous application of medium under pressure to the second chamber including a source of medium under pressure and first and second passages to afford communication between said source and the second chamber and said first passage providing for continuous communication between the source and the second chamber; means providing a restriction in said first passage; a third valve providing for opening and closing of the second passage; said third valve including fixed and movable elements, the fixed element having a pair of ports, one of said ports communicating with said source of medium under pressure and the other port communicating with the second chamber and said movable element having a pair of spaced recesses effective to establish communication between said ports; and means for operatively connecting the movable element of the third valve to the first valve; said last-named means and the spacing of the recesses being such that, during terminal portions of movements of the first valve, the third valve opens to establish communication through the second passage between the second chamber and the source of medium under pressure so as to provide for rapid port opening and port closing movements of the first valve.

6. In a motor device, an operating cylinder having ports communicating with the ends thereof; an operating piston in the cylinder; a first valve for opening and closing said ports to admit and to exhaust motive medium to each end of the operating cylinder, said first valve having opposed first and second piston faces; means cooperating with the first piston face to provide a first chamber; means cooperating with the second piston face to provide a second chamber; a second valve movable to a first position to supply pressure medium to the first chamber and to a second position to exhaust medium from the latter; means for moving the second valve to its first position at the ends of strokes of the operating piston in one direction and to its second position at the ends of strokes of the operating piston in the other direction; means providing for the continuous application of medium under pressure to the second chamber; the pressures of said medium supplied to the first chamber and of the medium supplied to the second chamber and the areas of said first and second piston faces being so related that the force of the pressure medium applied to the first piston face preponderates over that of the medium supplied to the second piston face to effect a stroke of the first valve in one direction when such medium is applied to the first chamber and to effect a stroke thereof in the other direction when said medium is exhausted from the first chamber; said means providing for continuous application of medium under pressure to the second chamber including a source of medium under pressure and first and second passages to afford communication between said source and the second chamber and said first passage providing for continuous communication between the source and the second chamber; means providing a restriction of variable flow area in said passage; a third valve for the second passage and including fixed and movable elements, the fixed element having a pair of ports, one of the ports communicating with the second passage and the other communicating with the interior of the second chamber, and said movable element having a pair of spaced recesses for establishing communication between said ports; means for operating the movable element of the third valve from the first valve and including a lost-motion connection; the extent of lost motion of said connection and the spacing of said recesses being such that the second passage is placed in unrestricted communication with the second chamber during terminal portions of strokes of the first valve so that the latter may have rapid port closing movements to interrupt the supply of motive medium to the operating cylinder; and means providing for the reduction of lost motion in said connection so that the movable element of the third valve may place said source in communication with said chamber to a desired extent during port opening movements of the first valve.

EARLL R. STONE.